United States Patent
Sharifipour et al.

(10) Patent No.: US 10,537,004 B2
(45) Date of Patent: Jan. 14, 2020

(54) LIGHT EMITTING DIODE ACTIVATION CONTROL

(71) Applicants: Bahman Sharifipour, Newington, NH (US); Fung Siu Kan, Hong Kong (HK); Ocean Wu, Shanghai (CN); Marti Willemsen, Shanghai (CN); Mark Thomas, Cupertino, CA (US)

(72) Inventors: Bahman Sharifipour, Newington, NH (US); Fung Siu Kan, Hong Kong (HK); Ocean Wu, Shanghai (CN); Marti Willemsen, Shanghai (CN); Mark Thomas, Cupertino, CA (US)

(73) Assignee: Katerra, Inc., Menlo Pak, CA (US)

( * ) Notice: Subject to any disclaimer, the term of this patent is extended or adjusted under 35 U.S.C. 154(b) by 0 days.

(21) Appl. No.: 16/213,737

(22) Filed: Dec. 7, 2018

(65) Prior Publication Data

US 2019/0132922 A1 May 2, 2019

Related U.S. Application Data

(62) Division of application No. 15/802,380, filed on Nov. 2, 2017, now abandoned.

(51) Int. Cl.
| | |
|---|---|
| *G05F 1/00* | (2006.01) |
| *H05B 37/02* | (2006.01) |
| *H05B 39/04* | (2006.01) |
| *H05B 41/36* | (2006.01) |
| *H05B 33/08* | (2006.01) |
| *H02J 7/00* | (2006.01) |
| *H02J 7/34* | (2006.01) |

(52) U.S. Cl.
CPC ........ *H05B 33/0845* (2013.01); *H02J 7/0068* (2013.01); *H05B 33/0806* (2013.01); *H05B 33/0815* (2013.01); *H05B 33/0821* (2013.01); *H02J 7/345* (2013.01)

(58) Field of Classification Search
None
See application file for complete search history.

(56) References Cited

U.S. PATENT DOCUMENTS

| | | | |
|---|---|---|---|
| 10,178,717 B2 | 1/2019 | Seyler | |
| 2011/0227489 A1* | 9/2011 | Huynh | H05B 33/083 315/185 R |
| 2012/0299489 A1* | 11/2012 | Sakuragi | H05B 33/0809 315/187 |
| 2013/0162149 A1 | 6/2013 | Vande Ven | |
| 2013/0249426 A1 | 9/2013 | Tao | |
| 2013/0313991 A1 | 11/2013 | Pan | |

(Continued)

OTHER PUBLICATIONS

Notice of Allowance dated Jun. 11, 2019, U.S. Appl. No. 16/197,003, filed Jan. 20, 2018, Applicant: Shanfu Gao, 15 pages.

*Primary Examiner* — Anh Q Tran
(74) *Attorney, Agent, or Firm* — Haverstock & Owens LLP

(57) ABSTRACT

A system and method may include receiving, at a first node of a circuit electrically coupled to a light emitting diode, a pulsed electrical signal that includes signal current pulses. The system and method may also include enabling discharging of a capacitor electrically coupled to the first node at an enable time that is during a particular time period between two particular signal current pulses of the pulsed electrical signal.

27 Claims, 6 Drawing Sheets

(56) References Cited

U.S. PATENT DOCUMENTS

| | | | |
|---|---|---|---|
| 2014/0175996 A1* | 6/2014 | Yoon | H05B 33/0842 |
| | | | 315/191 |
| 2015/0043212 A1 | 2/2015 | Coffey | |
| 2016/0034137 A1 | 11/2016 | Dekker | |
| 2017/0138542 A1 | 5/2017 | Gielen | |
| 2018/0363893 A1 | 12/2018 | Cheng | |
| 2019/0120438 A1 | 4/2019 | Wan | |

* cited by examiner

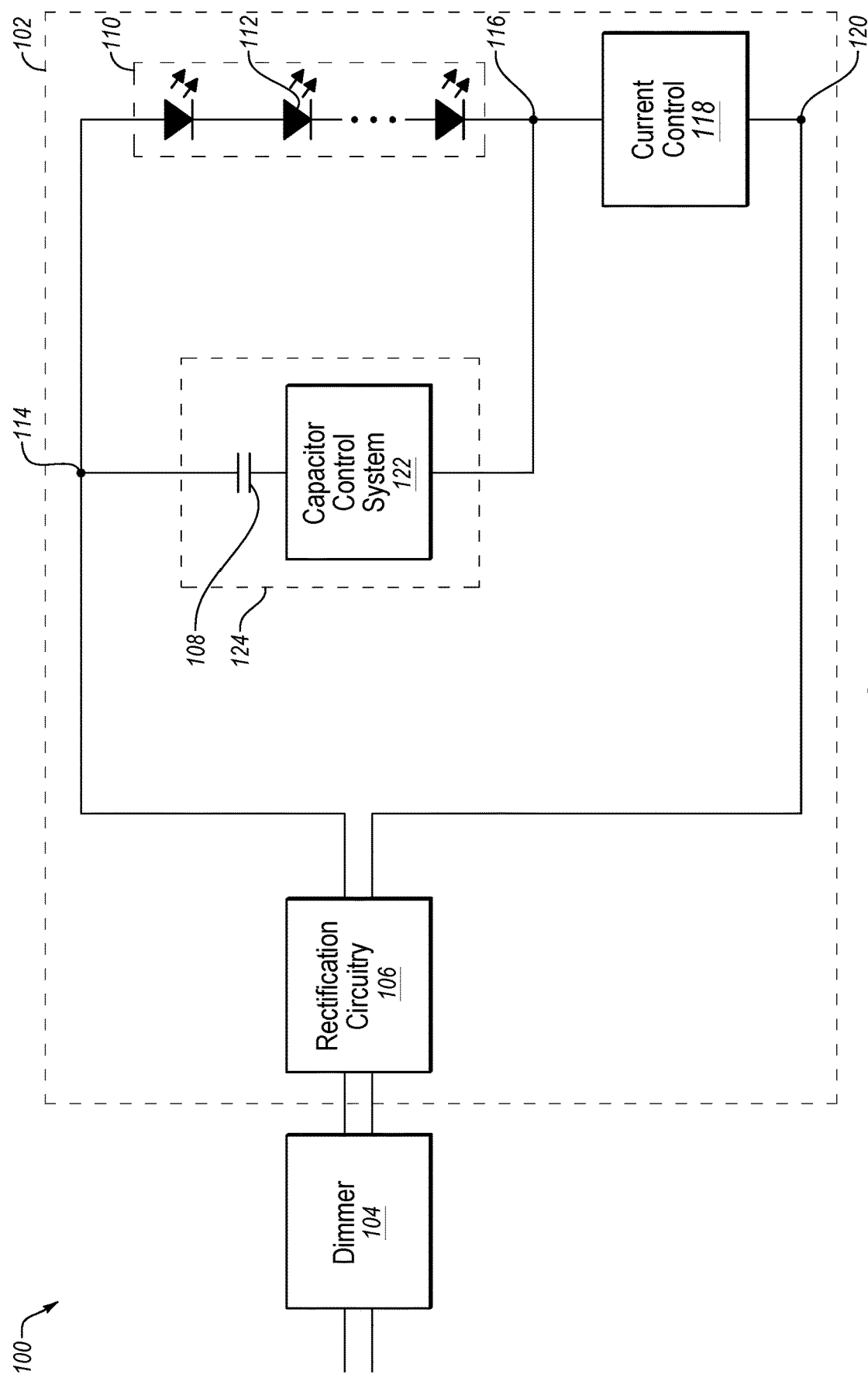

LIGHT EMITTING DIODE ACTIVATION CONTROL

RELATED APPLICATIONS

This application is a divisional application of co-pending U.S. patent application Ser. No. 15/802,380, filed on Nov. 2, 2017, and entitled "Light Emitting Diode Activation Control," which is hereby incorporated in its entirety by reference.

FIELD

The embodiments discussed in the present disclosure are related to control of activation of light emitting diodes.

BACKGROUND

Light emitting diodes ("LEDs") are being used more and more in traditional lighting situations due to their relatively long life and relatively low energy consumption as compared to some other systems and techniques used to provide lighting (e.g., as compared to incandescent lighting, fluorescent lighting, etc.) However, traditionally configured LEDs may flicker when attempted to be dimmed (e.g., via a dimming switch).

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system and method may include receiving, at a first node of a circuit electrically coupled to a light emitting diode, a pulsed electrical signal that includes signal current pulses. The system and method may also include enabling discharging of a capacitor electrically coupled to the first node at an enable time that is during a particular time period between two particular signal current pulses of the pulsed electrical signal.

The object and advantages of the embodiments will be realized and achieved at least by the elements, features, and combinations particularly pointed out in the claims. It is to be understood that both the foregoing general description and the following detailed description are given as examples and are explanatory and are not restrictive of the present disclosure, as claimed.

BRIEF DESCRIPTION OF THE DRAWINGS

Example embodiments will be described and explained with additional specificity and detail through the use of the accompanying drawings in which:

FIG. 1A illustrates an example system that may be configured to control activation of a light emitting diode (LED);

DESCRIPTION OF EMBODIMENTS

Figure 1B:
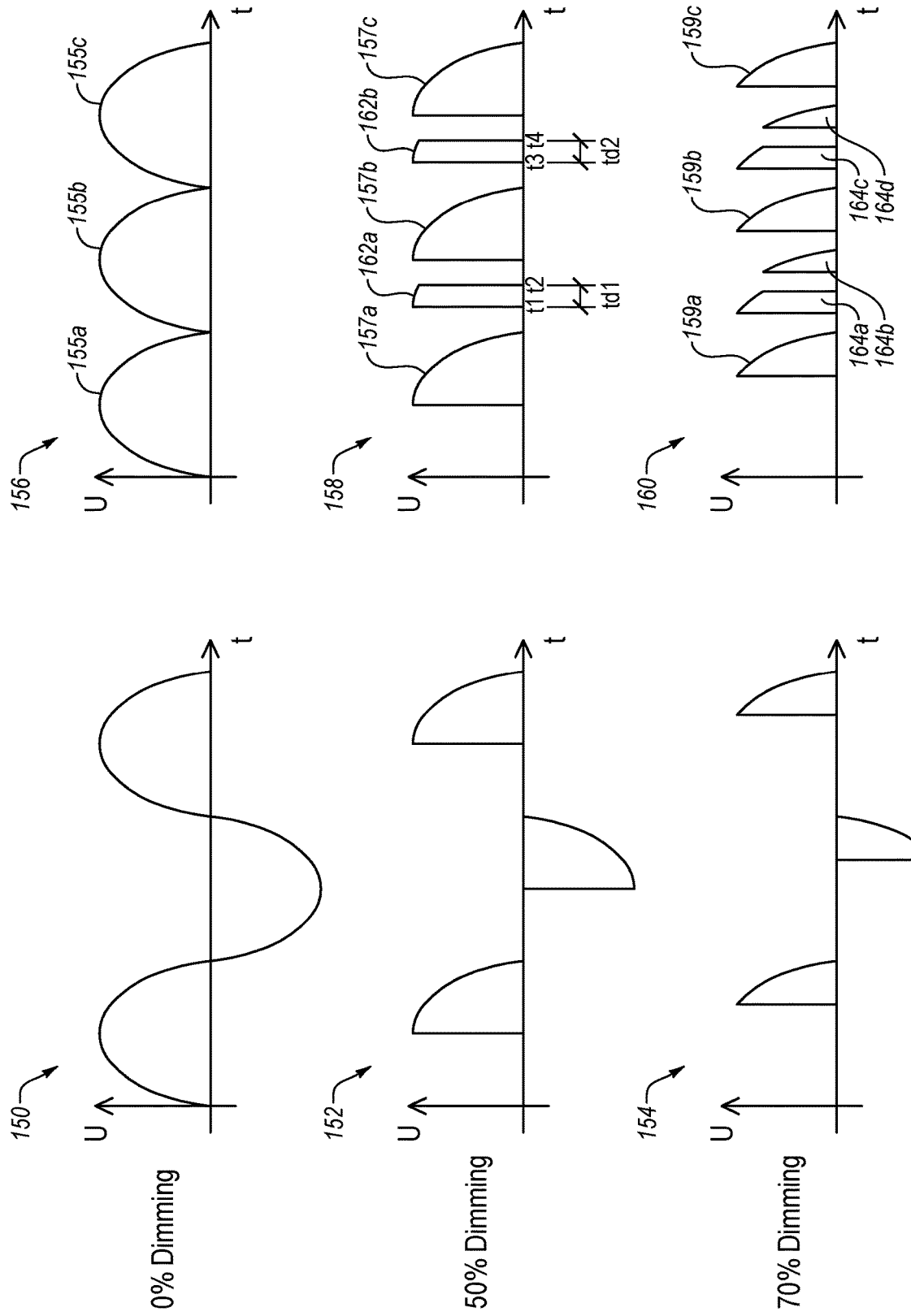
FIG. 1B illustrates example electrical signals that may be associated with the system of FIG. 1A.

In general, light emitting diodes ("LEDs") operate based on direct current (DC) electricity. Additionally or alternatively, in some instances, LEDs may be driven by a pulsed DC electrical signal that may include current pulses (e.g., a rectified DC signal that may be based on an alternating current (AC) signal). The LEDs may be activated and emit light in response to receiving a current pulse of the pulsed DC signal. In some situations, temporal spacing between the current pulses received by the LEDs may be such that the duration of "off time" of the LEDs between pulses may be greater than desired. For example, in a lighting situation, the temporal spacing between current pulses may be such that the turning on and off of the LEDs caused by the temporal spacing of the current pulses may be perceived by a person. The perception and noticeability of the turning on and off (also referred to as "flickering" in the present disclosure) may be irritating, uncomfortable, etc. to some.

According to one or more embodiments of the present disclosure, a system (e.g., a circuit) may include one or more LEDs that may be driven by a pulsed DC signal. In some embodiments, the system may be configured to generate one or more intermediate current pulses ("intermediate pulses") during time periods that may be between the current pulses of a pulsed DC signal. In the present disclosure, the current pulses that may be part of a pulsed DC signal and that are not the generated intermediate current pulses may be referred to as "signal pulses" to help distinguish between those current pulses and the generated intermediate pulses. Additionally or alternatively, the system may be configured to generate the intermediate pulses such that the intermediate pulses have durations that are less than the amount of time between signal pulses. The system may also be configured to add the intermediate pulses to the portions of the pulsed DC signal that are between signal pulses. The system may also be configured such that one or more LEDs may be driven by the pulsed DC signal with the intermediate pulses added therein Therefore, the duration of time between current pulses received by the LEDs that may be driven by the pulsed DC signal may be reduced. In some embodiments, the system may be implemented such that the reduction in duration of time between current pulses may reduce or eliminate perceived flickering of the LEDs. In the present disclosure, reference to a current pulse may refer to any type of periodic burst of electricity that may have a specific temporal duration. The actual shape, duration, magnitude, voltage, etc. of each current pulse may vary according to implementations, situations, etc.

Embodiments of the present disclosure will be explained with reference to the accompanying drawings.

FIG. 1A illustrates an example system 100 that may be configured to control activation of an LED, according to one or more embodiments of the present disclosure. The system 100 is described in the context of reducing LED flicker that may be caused by a dimming switch in a traditional lighting situation. However, the principles described may be applicable to any number of situations in which reducing a duration between when an LED may be on (e.g., emitting light) may be desired.

The system 100 may include LED circuitry 102 and dimmer 104. The dimmer 104 may include any suitable system, apparatus, or device, configured to receive an AC electrical signal and configured to output a dimmed AC electrical signal based on the received AC electrical signal. In some embodiments, the dimmer 104 may be configured to reduce an amount of power of the AC electrical signal to generate the dimmed AC electrical signal. For example, in some embodiments, the dimmer 104 may include a triac circuit configured to modify the AC electrical signal by cutting off portions of the AC electrical signal to generate the dimmed AC electrical signal. Additionally, as the degree of dimming increases, the amount of the AC electrical signal that may be cut off may be increased.

By way of example, FIG. 1B illustrates an example AC electrical signal 150 that may be received by the dimmer 104. Additionally, FIG. 1B illustrates a dimmed AC electrical signal 152 that may be the AC electrical signal 150 dimmed by 50%, as dimmed by the dimmer 104 via a triac circuit. Additionally, FIG. 1B illustrates a dimmed AC electrical signal 154 that may be the AC electrical signal 150 dimmed by 70%, as dimmed by the dimmer 104 via the triac circuit. As illustrated in FIG. 1B, the dimmed AC electrical signal 152 and the dimmed AC electrical signal 154 may vary with respect to each other and with respect to the AC electrical signal 150 according to an amount of the AC electrical signal 150 that is cut off by the triac circuit.

Returning to FIG. 1A, in some embodiments, the amount of dimming caused by the dimmer 104 may be based on a setting of the dimmer 104. For instance, the setting may be such that the dimmer 104 may dim the AC electrical signal from 0% dimming (i.e., no dimming at all) to 100% dimming (i.e., turned off) and anywhere in between. In these and other embodiments, the AC electrical signal that may be output by the dimmer 104 may accordingly be dimmed (or in some instances not dimmed at all) based on the setting of the dimmer 104.

The LED circuitry 102 may be configured to receive the AC electrical signal that may be output by the dimmer 104. In some embodiments, the LED circuitry 102 may include rectification circuitry 106 that may be configured to rectify the received AC electrical signal into a rectified DC electrical signal ("rectified DC signal") that may include current pulses. In some embodiments, the rectification circuitry 106 may be configured to perform full-wave rectification. Additionally or alternatively, the rectification circuitry 106 may be configured to perform half-wave rectification.

For example, referring back to FIG. 1B, in some embodiments, the rectification circuitry 106 may receive the AC electrical signal 150, the dimmed AC electrical signal 152, or the dimmed AC electrical signal 154 of FIG. 1B. Additionally, in some instances, the rectification circuitry 106 may be configured to perform full-wave rectification, the rectification circuitry 106 may be configured to generate a fully rectified DC electrical signal 156 ("rectified signal 156") that may be based on a full-wave rectification of the AC electrical signal 150. The rectified signal 156 may include current pulses 155*a*, 155*b*, and 105*c* (referred to collectively as "pulses 155"), which may be examples of signal pulses of the rectified signal 156. The frequency of occurrence of the pulses 155 may be twice that or substantially twice that of the frequency of the AC electrical signal 150. Additionally the frequency of occurrence of the pulses 155 may be referred to as the frequency of the rectified signal 156.

Additionally or alternatively, the rectification circuitry 106 may be configured to generate a fully rectified dimmed signal 158 ("dimmed rectified signal 158") that may be based on a full-wave rectification of the dimmed AC electrical signal 152. In these or other embodiments, the rectification circuitry 106 may be configured to generate a fully rectified dimmed signal 160 ("dimmed rectified signal 160") that may be based on a full-wave rectification of the dimmed AC electrical signal 154. The dimmed rectified signal 158 may include current pulses 157*a*, 157*b*, and 157*c* (collectively referred to as "pulses 157"), which may be examples of signal pulses of the dimmed rectified signal 158. Additionally, the dimmed rectified signal 160 may include current pulses 159*a*, 159*b*, and 159*c* (collectively referred to as "pulses 159"), which may be examples of signal pulses of the dimmed rectified signal 160. The pulses 157 and 159 may have an occurrence frequency the same as or substantially the same as the rectified signal 156. However, as indicated in FIG. 1B, the dimmed rectified signal 158 may include a first time period between the pulses 157 whereas the rectified signal 156 may include little to no time period between the pulses 155. Further, the dimmed rectified signal 160 may include a second time period between the pulses 159 in which the second time period may be greater than the first time period between the pulses 157.

By way of another example in the context of FIG. 1B, in instances in which the rectification circuitry 106 is configured to perform half-wave rectification, the rectified signal 156 may not include the current pulse 155*b*, the dimmed rectified signal 158 may not include the current pulse 157*b*, and the dimmed rectified signal 160 may not include the current pulse 159*b*. In these instances, the pulse frequency of the rectified signals may be cut in half as compared to the rectified signals that are based on full wave rectification. Additionally, the durations of the time periods between pulses may be increased in the half wave rectified signals as compared to the durations of time periods of the full wave rectified signals.

Returning to FIG. 1A, in some embodiments, the LED circuitry 102 may include an LED string 110 that may include one or more LEDs 112. The LED string 110 may be electrically coupled between a node 114 and a node 116 of the LED circuitry 102. Additionally, in instances in which the LED string 110 includes more than one LED 112 (e.g., such as illustrated in FIG. 1A) the LEDs 112 of the LED string 110 may be electrically coupled in series between the node 114 and the node 116.

Additionally, in some embodiments, the LED circuitry 102 may be configured such that the rectified DC signal output by the rectification circuitry 106 may be received at the node 114 of the LED circuitry 102. As such, due to the LED string 110 being electrically coupled to the node 114, the LED string 110 may be driven by the rectified DC signal such that the LEDs 112 of the LED string 110 may turn on and off based on the pulses of the rectified DC signal.

In these or other embodiments, the LED circuitry 102 may include current control circuitry 118 electrically coupled between the node 116 and a node 120 of the LED circuitry 102. The current control circuitry 118 may be configured to control the amount of current that passes from the node 116 to the node 120. The current control circuitry 118 may include any suitable arrangement of components configured to control the current. Additionally or alternatively, the current that may be controlled by the current control circuitry 118 may be determined based on particular current requirements of the LED string 110. As such, the current control circuitry 118 may be configured based on one or more parameters of the LED string 110, which may vary depending on particular implementations.

In some embodiments, the LED circuitry 102 may include a capacitor system 124 electrically coupled between the node 114 and the node 116. In some embodiments, the capacitor system 124 may include a capacitor 108 and a capacitor control system 122 electrically coupled to the capacitor 108. The capacitor control system 122 may include any suitable system, apparatus, or device configured to control charging and discharging of the capacitor 108.

In some embodiments, the capacitor control system 122 may be configured such that the capacitor 108 may charge based on signal pulses of the rectified DC signal that may be received at the node 114. In some embodiments, the capacitor control system 122 may be configured to allow charging of the capacitor 108 based on each signal pulse over a charging time period that is during each signal pulse received at the node 114. In some embodiments, the capacitor control system 122 may be configured such that the charging time period is the duration of or close to the duration of the signal pulses such that the capacitor 108 may charge over the entireties of or close to the entireties of the durations of the signal pulses. In these or other embodiments, the capacitor control system 122 may be configured to disable charging of the capacitor 108 after the magnitudes of the signal pulses fall below a particular level. It is noted that in some instances the capacitor 108 may already be fully charged when a signal current pulse is received at the node 114 such that the capacitor 108 may not actually charge, but would have charged had it not already been fully charged. As such, in some instances, the capacitor 108 may be "enabled" to charge but may not actually charge.

Additionally or alternatively, in some embodiments, the capacitor control system 122 may be configured to enable and disable discharging of the capacitor 108. In these and other embodiments, the capacitor control system 122 may be configured to enable and disable discharging of the capacitor 108 between signal current pulses of the rectified DC signal as received at the node 114. The enabling and disabling of the capacitor 108 between signal current pulses may be such that the capacitor may generate one or more intermediate current pulses ("intermediate pulses") at the node 114 that may be between two signal pulses such that the intermediate pulses may be added to the rectified DC signal. The capacitor 108 may be sized such and the enabling and disabling of the capacitor 108 may be such that the intermediate pulses may activate the LEDs 112 of the LED string 110. As such, the amount of time between when the LEDs 112 of the LED string 110 are on and emitting light may be reduced, which may reduce perception of flickering.

For example, in some embodiments, the capacitor control system 122 may be configured to enable discharging of the capacitor 108 at an enable time that is during a particular time period between two particular pulses at the node 114. In these or other embodiments, the capacitor control system 122 may be configured to disable discharging of the capacitor 108 at a disable time that is after the enable time and that is also during the particular time period. The capacitor 108 may thus discharge a current pulse over a discharge time period between the enable time and the disable time during the particular time period.

For instance, in reference to the dimmed rectified signal 158 of FIG. 1B, the capacitor control system 122 may be configured to enabling discharging of the capacitor 108 at a time t1 between the pulses 157a and 157b and may be configured to disable discharging of the capacitor 108 at a time t2 that may be after time t1 and that may also be between the pulses 157a and 157b. The enabling and disabling of the capacitor 108 between times t1 and t2 may cause the generation of an intermediate pulse 162a over a discharge time period of td1, which may be t2-t1. The capacitor control system 122 may be configured to generate an intermediate pulse 162b between the pulses 157b and 157c by similarly control discharging of the capacitor 108 over a discharge time period td2 between an enable time t3 and a disable time t4.

In some embodiments, the discharge time period td1 may be same as the discharge time period td2. In these or other embodiments, the discharge time period td1 may be different from the discharge time period td2. Additionally or alternatively, the relative temporal location of the intermediate pulse 162a with respect to the pulses 157a and 157b may be the same as or substantially the same as the relative temporal location of the intermediate pulse 162b with respect to the pulses 157b and 157c. Additionally or alternatively, the relative temporal location of the intermediate pulse 162a with respect to the pulses 157a and 157b may be different from the relative temporal location of the intermediate pulse 162b with respect to the pulses 157b and 157c.

Referring back to FIG. 1A, in some embodiments, the capacitor control system 122 may be configured to just enable discharging of the capacitor 108 after a particular amount of time has passed since a signal current pulse was received at the node 114 such that the enable time may be delayed with respect when the previous signal pulse ended but may also be before reception of the next signal pulse. In these and other embodiments, the capacitor control system 122 may be configured to allow the capacitor 108 to discharge until the capacitor 108 is unable to discharge anymore or until the next signal current pulse is received at the node 114 without actively disabling the discharging of the capacitor 108.

Additionally or alternatively, the discharge time period may have a discharge duration in which the capacitor 108 does not discharge as much as possible (e.g., as much as it is able to based on the configuration of the LED circuitry 102) but in which the current pulse that may be discharged has enough power to activate the LEDs 112 of the LED string 110. In some embodiments, enabling and disabling discharging of the capacitor 108 such that the discharge time is relatively short, but long enough to generate a current pulse sufficient to activate the LED string 110 may allow for a smaller capacitor than if no enabling or disabling of the capacitor 108 were performed. Additionally or alternatively, having the discharge duration be short enough that the capacitor does not fully discharge may allow for more than one enabling and disabling of discharging the capacitor 108 between two particular signal current pulses, which may reduce perceived flickering even more in some instances.

For example, in reference to the dimmed rectified signal 160 of FIG. 1B, the capacitor control system 122 may be configured to enable and disable discharging of the capacitor 108 such that intermediate pulses 164a and 164b are generated between the pulses 159a and 159b. Additionally, the capacitor control system 122 may be configured to enable and disable discharging of the capacitor 108 such that intermediate pulses 164c and 164d are generated between the pulses 159b and 159c. The relative temporal spacing of the intermediate pulses 164 with respect to each other and the pulses 159 may vary.

Referring back to FIG. 1A, in some embodiments, the timing of the enable time, the disable time and/or the number of intermediate current pulses that may be generated between signal pulses may be based on an amount of time since the previous signal pulse was received at the node 114, an amount of time until the next signal pulse may be received at the node 114, and/or a total amount of time of the temporal spacing between signal pulses. In these and other embodiments, the timing and/or number associated with the intermediate pulses may be based on the frequency of the pulsed DC signal. Additionally or alternatively, the timing and/or number associated with the intermediate pulses may be based on an average person's ability to perceive flickering that may be caused by temporal spacing between when the LEDs 112 are on, as caused by temporal spacing between current pulses received by the LEDs 112.

In these and other embodiments, the capacitor control system 122 may be configured such that the enable time(s), the disable time(s), and/or the number of intermediate pulses generated between two signal pulses may be such that the capacitor 108 may charge during its charging time at least as much as the capacitor 108 may discharge between two signal pulses. As indicated above, in some instances, the amount of time between signal current pulses and the duration of the signal current pulses may be based on an amount of dimming. As such, in some embodiments, the capacitor control system 122 may be configured to control the charging and the discharging of the capacitor 108 to allow the capacitor 108 to generate intermediate current pulses, which may reduce perceived flickering of the LEDs 112 during dimming of the LEDs 112.

Modifications, additions, or omissions may be made to the system 100 without departing from the scope of the present disclosure. For example, the system 100 may include different components than those listed. Further, the labeling of particular elements of the system 100 is to facilitate the description and is not meant to be limiting. Further, other electrical connections and components may be included to effectuate the operations described. Additionally, the number of components may vary. For example, the number of LEDs or capacitors may vary. Additionally, use of the terms "coupling" or "coupled" with respect to components may indicate a direct electrical connection between two components in which there may not be any other components between the two components. Further, use of the terms "coupling" or "coupled" with respect to components may indicate an indirect electrical connection between two components in which there may be one or more other components between the two components.

Additionally, the signals illustrated with respect to FIG. 1B are merely for illustrative and explanatory purposes and are not meant to be limited regarding the signals that may be used in the system 100. For example, the heights, frequencies, widths, etc. of the illustrated signal pulses and intermediate pulses illustrated in FIG. 1B may vary depending on different rectified DC signals, different capacitor discharge timings and frequencies, different capacitor charging timings and frequencies, and different numbers of capacitors and arrangements thereof.

In addition, the specific configuration of the system 100 may vary. For example, in the illustrated example of FIG. 1A, the capacitor control system 122 is illustrated as being coupled between the capacitor 108 and the node 116. However, in one or more other embodiments, the capacitor control system 122 may be coupled between the capacitor 108 and the node 114. Additionally, as illustrated in an example system 101 of FIG. 1C, in some embodiments, the capacitor control system 122 may be electrically coupled to the node 120 as illustrated instead of being electrically coupled to the node 116 as illustrated in FIG. 1A.

Additionally or alternatively, in some embodiments, the current control circuitry 118 may be configured to dynamically control the current that may pass from the node 116 to the node 120. For example, the current control circuitry 118 may be configured to turn on and off such that current passing from the node 116 to the node 120 may be turned on and off. In these or other embodiments, the current control circuitry 118 may accordingly control discharging and/or charging of the capacitor 108 by controlling the current that may pass from the node 116 to the node 120. As such, in some embodiments, the current control circuitry 118 may be configured to operate with the capacitor control system 122 to control the discharging and/or charging of the capacitor 108.

Additionally or alternatively, the current control circuitry 118 may operate solely as the capacitor control system such that the capacitor control system 122 as illustrated may be omitted. In instances in which the current control circuitry 118 may operate solely as the capacitor control system, the current control circuitry 118 may be configured to control the discharging and/or charging of the capacitor 108 according to one or more principles described above with respect to the controlling of the discharging and charging of the capacitor 108 by the capacitor control system 122.

Further, reference made to enabling or disabling charging or discharging of the capacitor 108 or of other capacitors as described in the present disclosure may refer to providing for configurations or scenarios in which the capacitors may be able to charge or discharge. In some instances, the capacitors may not actually charge or discharge even when enabled to if certain conditions are not present. Additionally, in some embodiments the same operations may be performed or the same configuration may be in place to enable a capacitor to charge or discharge. In these or other embodiments, whether or not the capacitor charges or discharges may depend on certain conditions being present (e.g., voltage levels at nodes to which the capacitors may be electrically coupled). As such, when reference is made to enabling a capacitor to charge the capacitor may also be enabled to discharge or vice versa in some embodiments.

Figure 2:
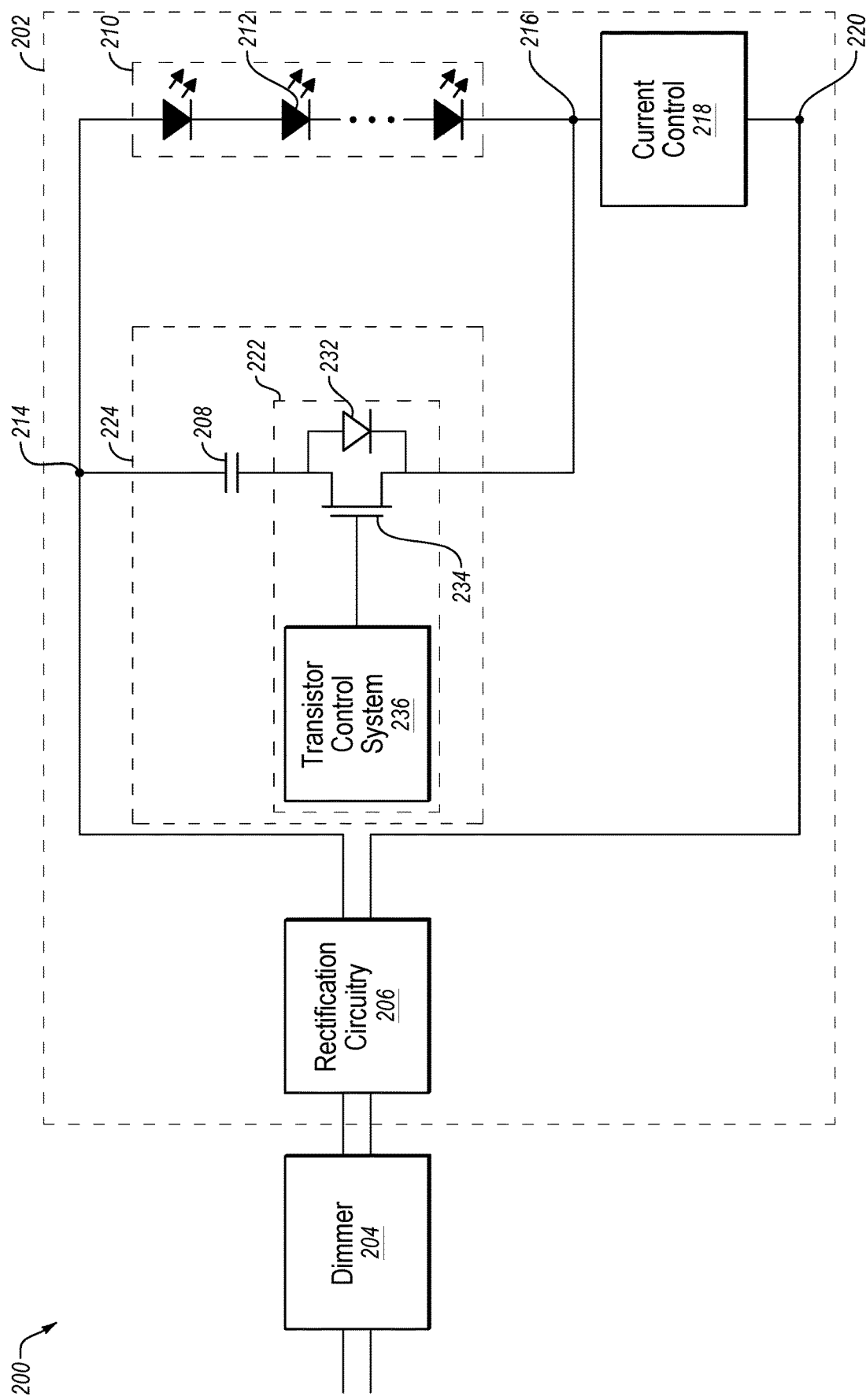
FIG. 2 illustrates a system that may be an example implementation of the system of FIG. 1A.

FIG. 2 illustrates a system 200 that may be an example implementation of the system 100 of FIG. 1A, according to at least one embodiment of the present disclosure. The system 200 may include a dimmer 204 and LED circuitry 202.

The dimmer 204 may be configured to receive an AC electrical signal and to output a dimmed AC electrical signal based on the received AC electrical signal. In some embodiments, the dimmer 204 may be analogous to the dimmer 104 of FIG. 1A.

The LED circuitry 202 may be an example implementation of the LED circuitry 102 of FIG. 1A. In some embodiments, the LED circuitry 202 may be configured to receive the AC electrical signal that may be output by the dimmer 204. In some embodiments, the LED circuitry 202 may include rectification circuitry 206 that may be configured to rectify the received AC electrical signal into a rectified DC electrical signal ("rectified DC signal") that may include current pulses. In some embodiments, the rectification circuitry 206 may be analogous to the rectification circuitry 106 of FIG. 1A.

In some embodiments, the LED circuitry 202 may include an LED string 210 that may include one or more LEDs 212. The LED string 210 may be electrically coupled between a node 214 and a node 216 of the LED circuitry 202 and may be analogous to the LED string 110 of FIG. 1A. In these or other embodiments, the LED circuitry 202 may include current control circuitry 218 electrically coupled between the node 216 and a node 220 of the LED circuitry 202. The current control circuitry 218 may be analogous to the current control circuitry 118 of FIG. 1A in some embodiments.

In some embodiments, the LED circuitry 202 may include a capacitor system 224 that may be an example implementation of the capacitor system 124 described above with respect to FIG. 1A. The capacitor system 224 may include a capacitor 208 that may be analogous to the capacitor 108 of FIG. 1A. Additionally, the capacitor system 224 may include a capacitor control system 222 that may be an example implementation of the capacitor control system 122 of FIG. 1A.

The capacitor control system 222 may be configured to control the charging and discharging of the capacitor 208 such as described above with respect to the capacitor control system 122 of FIG. 1A. The capacitor control system 222 may include a transistor 234 and a transistor control system 236 that may include any suitable system, apparatus, or device configured to control the charging and/or the discharging of the capacitor by controlling the transistor 234.

For example, in the illustrated example, the transistor 234 may be electrically coupled between the capacitor 208 and the node 216 in the manner illustrated. The transistor 234 may operate as a switch that may provide an electrical connection between the capacitor 208 and the node 216 via the transistor 234 when the transistor 234 is activated. Additionally, the electrical connection of the capacitor 208 to the node 216 through the transistor 234 may be terminated when the transistor 234 is not activated.

In the illustrated example, the transistor 234 is depicted as an n-type metal-oxide-semiconductor transistor ("n-mos transistor"). However, in some embodiments, the transistor 234 may be a different type of transistor. For example, in some embodiments, the transistor 234 may be a p-type metal-oxide-semiconductor transistor ("p-mos transistor"). Additionally or alternatively, the transistor 234 may be a bipolar junction transistor ("BJT") or any other transistor that may perform the operations described with respect to the transistor 234.

The transistor control system 236 may be electrically coupled to a control terminal of the transistor 234 (e.g., a gate terminal or a base terminal depending on the transistor type of the transistor 234). The transistor control system 236 may be configured to generate a control signal that may activate and deactivate the transistor 234. As described below, the activation and deactivation of the transistor 234 may control discharging and/or charging of the capacitor 208 such that the transistor control system 236 may control discharging and/or charging of the capacitor 208. In some embodiments, the transistor control system 236 may control the timing, duration, frequency, etc. of the discharging and/or charging of the capacitor 208 in a manner analogous to the timing, duration, frequency, etc. of the discharging and/or charging of the capacitor 108 described above with respect to FIG. 1A.

For example, in some embodiments, the transistor control system 236 may be configured to generate an oscillating control signal that may have a particular frequency, such that the transistor 234 may be activated and deactivated according to the particular frequency. Additionally or alternatively, the particular frequency of the oscillating control signal may be based on the frequency of the rectified DC signal. For example, the particular frequency of the oscillating control signal may be higher than the frequency of the rectified DC signal such that the transistor 234 may be activated (and possibly) deactivated between signal pulses of the rectified DC signal. Additionally or alternatively, the oscillating control signal may have a frequency based on the rectified DC signal such that at least in some instances, a period of the oscillating control signal may be less than an amount of time between signal pulses.

Additionally or alternatively, the particular frequency of the oscillating control signal may be based on an amount of time that the capacitor 208 may need to discharge to generate an intermediate pulse with enough power to drive the LED string 210. For example, in some embodiments, the frequency of the oscillating control signal may be between 1.5 times and 20 times that of the rectified DC signal.

In these or other embodiments, the transistor control system 236 may be configured to generate the control signal as a pulse ("pulsed control signal") that may activate the transistor 234 at a time between signal pulses of the rectified DC signal. In some embodiments, the transistor control system 236 may be configured to receive the rectified DC signal (not expressly illustrated in FIG. 2). Additionally or alternatively, based on the received rectified DC signal, the transistor control system 236 may be configured to detect times between signal pulses of the rectified DC signal and may generate the pulsed control signal at those times.

In these or other embodiments, the transistor control system 236 may be configured to activate the transistor 234 when signal pulses are received at the node 214 such that the capacitor 208 may charge based on the signal pulses. In some embodiments, the transistor control system 236 may be configured to activate the transistor 234 during an entire duration of or almost an entire duration of one or more signal pulses to maximize or almost maximize an amount of time that the capacitor 208 may be able to charge.

In these or other embodiments, the transistor control system 236 may only activate the transistor 234 during part of the duration of the signal pulses. For example, the transistor control system 236 may activate the transistor 234 when the magnitudes of the signal pulses are above a particular level. In these or other embodiments, the transistor control system 236 may be configured to deactivate the transistor 234 when the magnitudes of the signal pulses are below the particular level. In these or other embodiments, in instances in which the transistor control system 236 generates an oscillating control signal, the transistor control system 236 may be configured to modify the oscillating control signal to deactivate the transistor 234 when the magnitudes of the signal pulses are below the particular level. In some instances, deactivating the transistor 234 when the magnitudes of the signal pulses are below the particular level may reduce or prevent undesired discharging of the capacitor 208.

In these or other embodiments, the capacitor control system 222 may include a diode 232. The diode 232 may be electrically coupled between the capacitor 208 and the node 216 in parallel with the transistor 234 in the manner illustrated. As illustrated, the diode 232 may be coupled such that the anode of the diode 232 may be electrically coupled to the capacitor and such that the cathode of the diode 232 may be coupled to the node 216. As such, the diode 232 may be configured to generally allow current to flow to the node 216 but not from the node 216. The diode 232 may include any suitable electrical component or element that may perform the operations described with respect to the diode 232.

The diode 232 configured in the manner described and illustrated may be such that the capacitor 208 may charge in instances in which the transistor 234 may not be activated but may also be such that the capacitor 208 may not discharge in instances in which the transistor 234 may not be activated. For example, when a signal pulse is received at the node 214 and the capacitor 208 is not charged to a particular amount, a voltage differential between the anode and the cathode of the diode 232 may be such that the diode 232 may activate and create an electrical connection between the capacitor 208 and the node 216, regardless of whether or not the transistor 234 is activated. As such, the diode 232 may allow for charging of the capacitor 208 even when the transistor 234 is not activated. Conversely, when a signal pulse is not at the node 214, the voltage difference between the anode and the cathode of the diode 232 may be so low that the diode 232 may not be activated such that an electrical connection between the capacitor 208 and the node 216 may not be formed via the diode 232. As such, the diode 232 may not cause discharging of the capacitor at times when the transistor 234 is deactivated. Such a configuration of the diode 232 with the transistor 234 may thus allow for and enable charging of the capacitor 208 without having to activate or deactivate the transistor 234.

In the present disclosure, reference to a transistor being activated or being active may refer to the transistor being in a state in which electric current may pass through the transistor. Further, reference to a transistor being inactivated or inactive may refer to the transistor being in a state in which little to no electric current may pass through the transistor and may include when the transistor is operating in the cutoff region of operation. Further, reference of electric current passing through a transistor in the present disclosure may generally refer to current passing between a collector and an emitter in a BJT or current passing between a drain and source in a FET. In addition, reference of a transistor being coupled between nodes or components may refer to the drain and the source or the collector and emitter being coupled between the nodes or components. Similarly, reference to a diode being active, inactive, activated, or inactivated may refer to whether or not current passes between the anode and the cathode of the diode.

Modifications, additions, or omissions may be made to the system 200 without departing from the scope of the present disclosure. For example, properties (e.g., sizes, resistance, voltages, currents, geometry, type, etc.) of the components listed may vary depending on different implementations. Further, depending on different implementations, other components than those described may be included in the system 200 or one or more components may be removed. In addition, certain components have been described as being included in certain types of circuitry for the ease of explanation, but the labels of the circuitry are not meant to be limiting or to imply that components included therein are limited to functionality described with respect to such circuitry. In addition, one or more components described may be omitted. For example, in some embodiments, the diode 232 may be omitted and enabling or disabling of charging of the capacitor 208 may be performed by the transistor control system 236 activating and deactivating the transistor 234.

Additionally, in some embodiments the current control circuitry 218 may be configured to dynamically control the current that may pass from the node 216 to the node 220 to help control the charging and/or discharging of the capacitor 208 such that the current control circuitry 218 may be deemed to be part of the capacitor control system 222. Additionally or alternatively, the current control circuitry 218 may be configured to perform static current control.

In addition, the specific configuration of the system 200 may vary. For example, in the illustrated example of FIG. 2, the capacitor control system 222 is illustrated as being coupled between the capacitor 208 and the node 216. However, in one or more other embodiments, the capacitor control system 222 may be coupled between the capacitor 208 and the node 214. Additionally, similar to as illustrated in the example system 101 of FIG. 1C, in some embodiments, the capacitor control system 222 may be electrically coupled to the node 220 instead of the node 216.

Figure 1C:
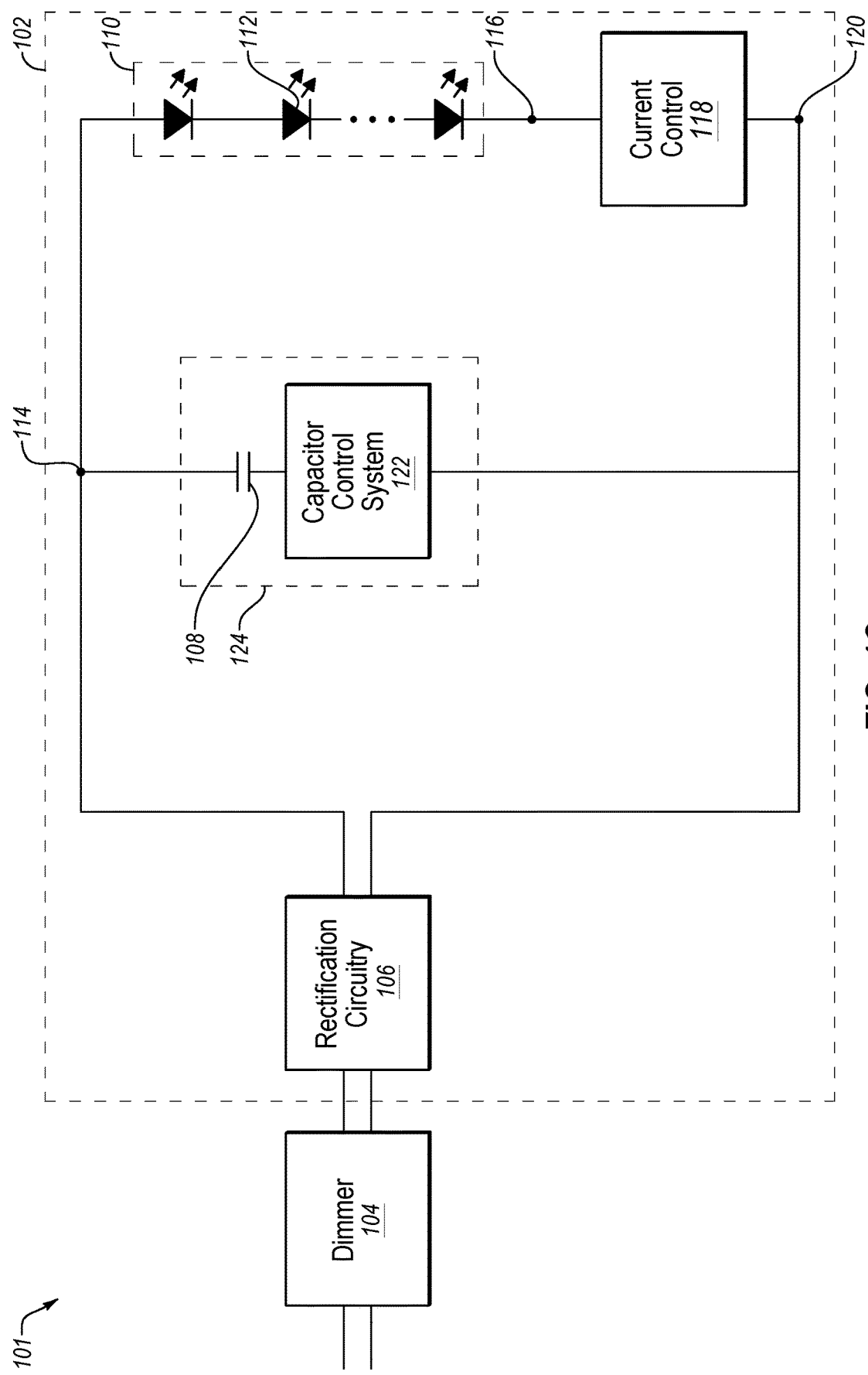
FIG. 1C illustrates another example system that may be configured to control the activation of an LED.
Figure 3:
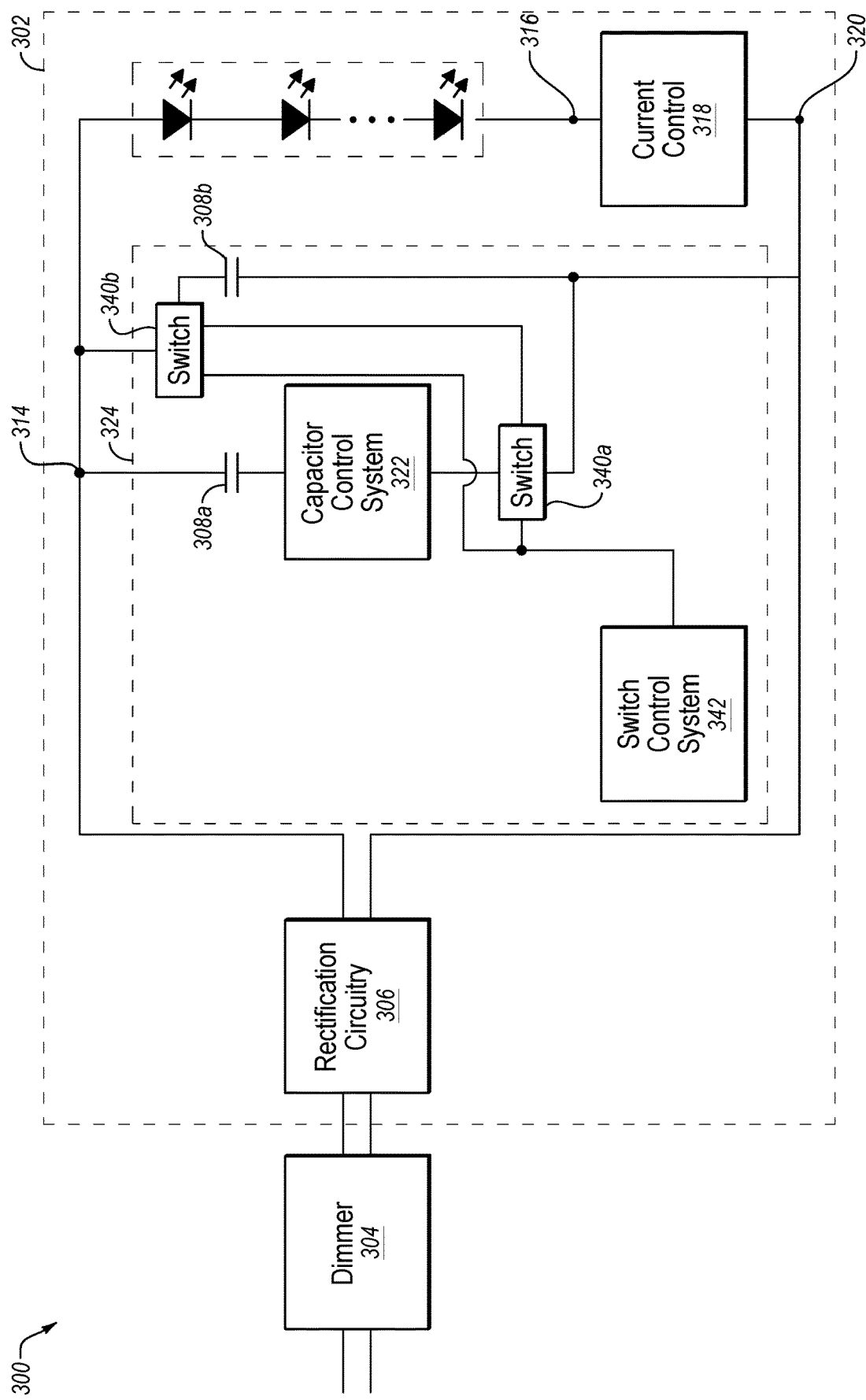
FIG. 3 illustrates a system that may be an example implementation of the system of FIG. 1C.

FIG. 3 illustrates a system 300 that may be an example implementation of the system 101 of FIG. 1C, according to at least one embodiment of the present disclosure. The system 300 may include a dimmer 304 and LED circuitry 302.

The dimmer 304 may be configured to receive an AC electrical signal and to output a dimmed AC electrical signal based on the received AC electrical signal. In some embodiments, the dimmer 304 may be analogous to the dimmer 104 of FIG. 1A.

The LED circuitry 302 may be an example implementation of the LED circuitry 102 of FIG. 1A. In some embodiments, the LED circuitry 302 may be configured to receive the AC electrical signal that may be output by the dimmer 304. In some embodiments, the LED circuitry 302 may include rectification circuitry 306 that may be configured to rectify the received AC electrical signal into a rectified DC electrical signal ("rectified DC signal") that may include current pulses. In some embodiments, the rectification circuitry 306 may be analogous to the rectification circuitry 106 of FIG. 1A.

In some embodiments, the LED circuitry 302 may include an LED string 310 that may include one or more LEDs 312. The LED string 310 may be electrically coupled between a node 314 and a node 316 of the LED circuitry 302 and may be analogous to the LED string 110 of FIG. 1A. In these or other embodiments, the LED circuitry 302 may include current control circuitry 318 electrically coupled between the node 316 and a node 320 of the LED circuitry 302. The current control circuitry 318 may be analogous to the current control circuitry 118 of FIG. 1A in some embodiments.

In some embodiments, the LED circuitry 302 may include a capacitor system 324 that may be an example implementation of the capacitor system 124 described above with respect to FIG. 1A. The capacitor system 324 may include a capacitor control system 322 that may be analogous to the capacitor control system 122 of FIG. 1A or the capacitor control system 222 of FIG. 2.

The capacitor system 324 may also include a first capacitor 308a and a second capacitor 308b. The inclusion of the first capacitor 308a and the second capacitor 308b may allow for more efficient use of the charge stored to generate larger, longer, and/or more intermediate pulses than if a single capacitor were used. Additionally or alternatively, the inclusion of the first capacitor 308a and the second capacitor 308b may allow for smaller sizing of the first capacitor 308a and the second capacitor 308b. In some embodiments, the capacitor system 324 may be configured in a first configuration such that the first capacitor 308a and the second capacitor 308b may be electrically coupled in series with each other between the node 314 and the node 320 during discharging of the first capacitor 308a and the second capacitor 308b. In these or other embodiments, the capacitor system 324 may be configured in a second configuration such that the first capacitor 308a and the second capacitor 308b may be electrically coupled in parallel between the node 314 and the node 320 during charging of the first capacitor 308a and the second capacitor 308b.

For example, the capacitor system 324 may include a first switch 340a and a second switch 340b. The first capacitor 308a, the second capacitor 308b the first switch 340a, and the second switch 340b may be configured such that the second capacitor 308b is electrically coupled in series with each other between the first capacitor 308a and the node 320 when the first switch 340a and the second switch 340b are in a first configuration.

For example, in the first configuration, the first switch 340a may provide an electrical connection between the capacitor control system 322 to the second switch 340b. Further, in the first configuration, the first switch 340a may disconnect an electrical connection between the capacitor control system 322 and the node 320. Additionally, in the first configuration, the second switch 340b may provide an electrical connection between the first switch 340a and the capacitor 308b. Further, in the first configuration, the second switch 340b may disconnect an electrical connection between the node 314 and the second capacitor 308b. In addition, the second capacitor 308b may be electrically coupled between the second switch 340b and the node 320.

Additionally or alternatively, the first capacitor 308a, the capacitor 308b the first switch 340a, and the second switch 340b may be configured such that the second capacitor 308b is electrically coupled between the node 314 and the node 320 in parallel with the first capacitor 308b when the first switch 340a and the second switch 340b are in a second configuration. For example, in the second configuration, the second switch 340a may disconnect an electrical connection between the capacitor control system 322 and the second switch 340b. Further, in the second configuration, the first switch 340a may provide an electrical connection between the capacitor control system 322 and the node 320. Additionally, in the second configuration, the second switch 340b may disconnect an electrical connection between the first switch 340a and the second capacitor 308b. Further, in the second configuration, the second switch 340b may provide an electrical connection between the node 314 and the second capacitor 308b.

In some embodiments, the capacitor system 324 may also include a switch control system 342. The switch control system 342 may include any suitable system, apparatus, or device configured to control the operations of the first switch 340a and the second switch 340b. In some embodiments, the switch control system 342 may be configured to place the first switch 340a and the second switch 340b in different configurations based on whether or not the first capacitor 308a and the second capacitor 308b are to be charging or discharging.

For example, the switch control system 342 may be configured to place the first switch 340a and the second switch 340b in the first configuration during a discharge time period of the first capacitor 308a and the second capacitor 308b. As such, the first capacitor 308a and the second capacitor 308b may be in series with each other between the node 314 and the node 320 during the discharge time period, which may allow for a greater amount of charge to be available during the discharge time period than if the first capacitor 308a and the second capacitor 308b were in parallel with each other between the node 314 and the node 320.

In some embodiments, the switch control system 342 may be configured to operate in conjunction with the capacitor control system 322 such that the first switch 340a and the second switch 340b are in the first configuration during times that intermediate pulses are to be generated. Additionally or alternatively, the switch control system 342 may be configured to receive the rectified DC signal received at the node 314 (not expressly illustrated in FIG. 3). In these or other embodiments, the switch control system 342 may be configured to place the first switch 340a and the second switch 340b in the first configuration based on times between signal pulses at the node 314.

Additionally or alternatively, in some embodiments, the switch control system 342 may be configured to place the first switch 340a and the second switch 340b in the second configuration during a charging time period of the first capacitor 308a and the second capacitor 308b. As such, the first capacitor 308a and the second capacitor 308b may be in parallel with each other between the node 314 and the node 320 during the charging time period.

In some embodiments, the switch control system 342 may be configured to operate in conjunction with the capacitor control system 322 such that the first switch 340a and the second switch 340b are in the second configuration during charging times of the first capacitor 308a and the second capacitor 308b. Additionally or alternatively, the switch control system 342 may be configured to receive the rectified DC signal received at the node 314 (not expressly illustrated in FIG. 3). In these or other embodiments, the switch control system 342 may be configured to place the first switch 340a and the second switch 340b in the second configuration based on times when signal pulses are received at the node 314.

Modifications, additions, or omissions may be made to the system 300 without departing from the scope of the present disclosure. For example, properties (e.g., sizes, resistance, voltages, currents, geometry, type, etc.) of the components listed may vary depending on different implementations. Further, depending on different implementations, other components than those described may be included in the system 300 or one or more components may be removed or added. For example, the number of switches and/or capacitors may vary. In addition, certain components have been described as being included in certain types of circuitry for the ease of explanation, but the labels of the circuitry are not meant to be limiting or to imply that components included therein are limited to functionality described with respect to such circuitry. For example, in some embodiments, the switch control system 342 may be included in or part of one or more components of the capacitor control system 322.

Additionally, in some embodiments the current control circuitry 318 may be configured to dynamically control the current that may pass from the node 316 to the node 320 to help control the charging and/or discharging of the capacitors 308 such that the current control circuitry 318 may be deemed to be part of the capacitor control system 322. In these or other embodiments, the capacitor control system 322 as illustrated may be omitted and the current control circuitry 318 may perform the operations of capacitor control regarding controlling discharging and/or charging of the capacitors 308. Additionally or alternatively, the current control circuitry 318 may be configured to perform static current control.

In addition, the specific configuration of the system 300 may vary. For example, the relative arrangements of the capacitor control system 322, the switches 340a and 340b, and the capacitors 308a and 308b may vary.

Figure 4:
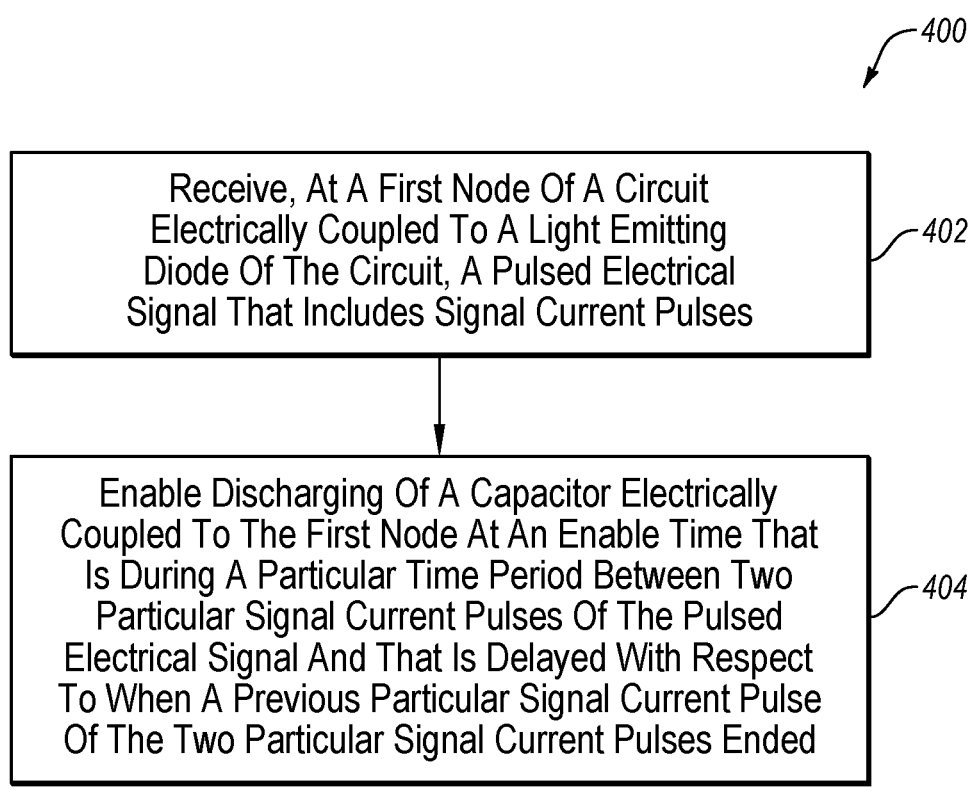
FIG. 4 is a flowchart of an example method of controlling activation of a light emitting diode.

FIG. 4 is a flowchart of an example method 400 of controlling an LED, according to some embodiments described in the present disclosure. One or more operations of the method 400 may be implemented, in some embodiments, by a system such as the systems 100, 200, or 300 described above with respect to FIGS. 1A, 2, and 3. Although the method 400 is illustrated as certain operations being performed with respect to discrete blocks, various blocks may be divided into additional blocks, combined into fewer blocks, or eliminated, depending on the implementation.

The method 400 may begin at block 402 at which a pulsed electrical signal that includes signal current pulses ("signal pulses") may be received. In some embodiments, the pulsed electrical signal may be received at a first node of a circuit. The first node may be electrically coupled to an LED of the circuit. In some embodiments, the method 400 may include receiving an AC electrical signal and generating the pulsed electrical signal based on the AC electrical signal. For example, in some embodiments, the pulsed electrical signal may be a DC rectified signal of the AC electrical signal. Additionally, the nodes 114, 214, and 314 of FIGS. 1A, 1C, 2 and 3, may be examples of the first node.

At block 404, discharging of a capacitor may be enabled at an enable time that is during a particular time period between two particular signal pulses of the pulsed electrical signal. In some embodiments, the enable time may be delayed with respect to when a previous particular signal pulse of two particular signal pulses ended. In these and other embodiments, the enable time may not be delayed with respect to when a previous particular signal pulse of two particular signal pulses ended.

Additionally or alternatively, the method 400 may include disabling discharging of the capacitor at a disable time that is after the enable time and during the particular time period such that the capacitor discharges an intermediate current pulse over a discharge time period between the enable time and the disable time during the particular time period between the two particular signal pulses. In some embodiments, the discharge time period may have a discharge duration in which the capacitor does not fully discharge.

Additionally or alternatively, the method may include enabling discharging of the capacitor by activating a transistor electrically coupled between the capacitor and a second node of the circuit. In these or other embodiments, the transistor may be activated via an oscillating control signal or a pulse control signal, or a combination thereof.

The capacitor may be electrically coupled between the first node of the circuit and the second node of the circuit and the LED may also be electrically coupled between the first node and the second node in parallel with the capacitor such that the discharging of the capacitor may activate the LED. The nodes 116 and 216 of FIGS. 1A and 2 may be examples of the second node in some embodiments. Additionally, the nodes 116 and 316 of FIGS. 1C and 3 may also be examples of the second node in some embodiments.

In these or other embodiments, the method 400 may include allowing charging of the capacitor based on the signal pulses of the pulsed electrical signal. In these or other embodiments, the method 400 may include allowing charging of the capacitor for an entire duration of or substantially an entire duration of the signal pulses. Additionally or alternatively, the method 400 may include enabling charging of the capacitor when the magnitudes of the signal pulses are above a particular level. In these or other embodiments, the method 400 may include disabling charging of the capacitor after the magnitudes of the signal pulses fall below the particular level. Additionally or alternatively, the method 400 may include allowing charging of the capacitor over a charging time period that is longer than the discharging time period.

Accordingly, the method 400 may be used to control activation of an LED according to the present disclosure. Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the circuit may include multiple capacitors and the method 400 may include operations related to placing multiple capacitors in series with respect to each other during discharging of the capacitors. Additionally or alternatively, the method 400 may include placing the capacitors in parallel with respect to each other during charging of the first capacitor and the second capacitor. In these or other embodiments, the circuit may include one or more switches configured to place the capacitors in series or parallel and the method may include controlling the switches to place the capacitors in series or parallel.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one," "one or more," "at least one of the following," and "one or more of the following" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A system comprising:
    a first node configured to receive a pulsed electrical signal that includes signal current pulses;
    a light emitting diode electrically coupled between the first node and a second node;
    a capacitor electrically coupled between the first node and the second node in parallel with the light emitting diode, wherein a capacitor discharge path is formed that includes the capacitor, the first node, the light emitting diode, and the second node; and
    a capacitor control system electrically coupled to the capacitor and positioned within the capacitor discharge path, the capacitor control system is configured to:
        enable discharging of the capacitor at an enable time that is during a particular time period between two particular signal current pulses of the pulsed electrical signal; and
        disable discharging of the capacitor at a disable time that is after the enable time and during the particular time period such that the capacitor discharges an intermediate current pulse over a discharge time period between the enable time and the disable time during the particular time period between the two particular signal current pulses.

2. The system of claim 1 wherein the first node, the capacitor, the capacitor control system, and the second node form a capacitor charge path.

3. The system of claim 2 wherein the capacitor control system is further configured to enable charging of the capacitor based on the signal current pulses of the pulsed electrical signal.

4. The system of claim 2 wherein the capacitor control system is further configured to selectively enable and disable charging of the capacitor during each signal current pulse.

5. The system of claim 2 wherein the capacitor control system comprises:
    a transistor electrically coupled between the capacitor and the second node; and
    a transistor control system electrically coupled to a control terminal of the transistor and configured to provide a control signal to the control terminal to enable and disable discharging of the capacitor by activating and deactivating the transistor during the particular time period between the two particular signal current pulses, wherein the particular time period corresponds to a zero value of the pulsed electrical signal.

6. The system of claim 5 wherein the control signal has a discharging switching pulse to activate and deactivate the transistor during the particular time period between the two particular signal current pulses, the discharging switching pulse enables a corresponding intermediate current pulse discharged by the capacitor.

7. The system of claim 5 wherein the control signal has a charging switching pulse to activate and deactivate the transistor during a time period coincident with each of the signal current pulses such that during each of the signal current pulses charging of the capacitor is enabled.

8. The system of claim 1 further comprising a rectification circuit electrically coupled to the first node and configured to receive an alternating current electrical signal and generate the pulsed electrical signal based on the alternating current electrical signal.

9. The system of claim 1 further comprising a current control circuit electrically coupled between the second node and a third node, the current control circuit being configured to control current that passes through the light emitting diode.

10. A method comprising:
    receiving, at a first node of a circuit electrically coupled to a light emitting diode of the circuit, a pulsed electrical signal that includes signal current pulses, wherein the light emitting diode is electrically coupled between the first node and a second node, a capacitor is electrically coupled between the first node and the second node in parallel with the light emitting diode, wherein a capacitor discharge path is formed that includes the capacitor, the first node, the light emitting diode, and the second node; and
    enabling discharging of the capacitor by a capacitor control system electrically coupled to the capacitor and positioned within the capacitor discharge path, wherein discharging of the capacitor is enabled during an intermediate pulse time period that occurs during a particular time period between two particular signal current pulses of the pulsed electrical signal, and the capacitor discharges an intermediate current pulse over the intermediate pulse time period during the particular time period between the two particular signal current pulses.

11. The method of claim 10 wherein the first node, the capacitor, the capacitor control system, and the second node form a capacitor charge path, and the method further comprises enabling charging of the capacitor based on the signal current pulses of the pulsed electrical signal.

12. The method of claim 11 further comprising selectively enabling and disabling charging of the capacitor during each signal current pulse.

13. The method of claim 12 further comprising enabling charging of the capacitor by activating a transistor within the capacitor control system electrically coupled between the capacitor and the second node of the circuit.

14. The method of claim 13 wherein enabling charging of the capacitor comprises generating a control signal having a charging switching pulse to activate and deactivate the transistor during a time period coincident with each of the signal current pulses such that during each of the signal current pulses charging of the capacitor is selectively enabled.

15. The method of claim 10 further comprising enabling discharging of the capacitor by activating a transistor within the capacitor control system electrically coupled between the capacitor and the second node of the circuit.

16. The method of claim 15 further comprising disabling discharging of the capacitor by deactivating the transistor.

17. The method of claim 16 wherein enabling discharging of the capacitor comprises generating a control signal having a discharging switching pulse to activate and deactivate the transistor during the particular time period between the two particular signal current pulses, the discharging switching pulse enables a corresponding intermediate current pulse discharged by the capacitor, wherein the particular time period corresponds to a zero value of the pulsed electrical signal.

18. The method of claim 10 further comprising:
receiving an alternating current electrical signal; and
generating the pulsed electrical signal based on the alternating current electrical signal.

19. A system comprising:
a first node configured to receive a pulsed electrical signal that includes signal current pulses;
a light emitting diode electrically coupled between the first node and a second node;
a capacitor electrically coupled between the first node and the second node in parallel with the light emitting diode, wherein a capacitor discharge path is formed that includes the capacitor, the first node, the light emitting diode, and the second node; and
a capacitor control system electrically coupled to the capacitor and positioned within the capacitor discharge path, the capacitor control system is configured to:
enable discharging of the capacitor during each of a plurality of intermediate pulse time periods, wherein the plurality of intermediate pulse time periods occur during a particular time period between two particular signal current pulses of the pulsed electrical signal, wherein the capacitor discharges an intermediate current pulse over each intermediate pulse time period during the particular time period between the two particular signal current pulses; and
disable discharging of the capacitor between each of the plurality of intermediate pulse time periods during the particular time period.

20. The system of claim 19 wherein the first node, the capacitor, the capacitor control system, and the second node form a capacitor charge path.

21. The system of claim 20 wherein the capacitor control system is further configured to enable charging of the capacitor based on the signal current pulses of the pulsed electrical signal.

22. The system of claim 20 wherein the capacitor control system is further configured to selectively enable and disable charging of the capacitor during each signal current pulse.

23. The system of claim 20 wherein the capacitor control system comprises:
a transistor electrically coupled between the capacitor and the second node; and
a transistor control system electrically coupled to a control terminal of the transistor and configured to provide a control signal to the control terminal to enable and disable discharging of the capacitor by activating and deactivating the transistor, wherein the control signal has a plurality of switching pulses to activate and deactivate the transistor during the particular time period between the two particular signal current pulses, each switching pulse enables a corresponding one of the intermediate current pulses for discharging the capacitor, wherein the particular time period corresponds to a zero value of the pulsed electrical signal.

24. The system of claim 23 wherein the control signal has a plurality of discharging switching pulses to activate and deactivate the transistor during the particular time period between the two particular signal current pulses, each discharging switching pulse enables a corresponding intermediate current pulse discharged by the capacitor.

25. The system of claim 23 wherein the control signal has one or more charging switching pulses to activate and deactivate the transistor during a time period coincident with each of the signal current pulses such that during each of the signal current pulses charging of the capacitor is enabled during each charging switching pulse.

26. The system of claim 19 further comprising a rectification circuit electrically coupled to the first node and configured to receive an alternating current electrical signal and generate the pulsed electrical signal based on the alternating current electrical signal.

27. The system of claim 19 further comprising a current control circuit electrically coupled between the second node and a third node, the current control circuit being configured to control current that passes through the light emitting diode.

* * * * *